United States Patent [19]

Urbain et al.

[11] Patent Number: 5,412,929
[45] Date of Patent: May 9, 1995

[54] STEERABLE TANDEM IMPLEMENT HITCH

[76] Inventors: Clete Urbain, 425 4th Ave. NE.;
Gene Prier, Rte. 2, Box 153, both of Dyersville, Iowa 52040

[21] Appl. No.: 140,930
[22] Filed: Oct. 25, 1993
[51] Int. Cl.6 ............................................. A01D 80/00
[52] U.S. Cl. ........................................ 56/15.4; 56/15.5;
56/376; 56/56.14; 280/412
[58] Field of Search .................... 56/15.4, 15.5, 366,
56/376, DIG. 14; 280/411.1, 412; 172/677

[56] References Cited

U.S. PATENT DOCUMENTS

| | | |
|---|---|---|
| 1,012,220 | 12/1911 | Pearson . |
| 2,316,397 | 4/1943 | Briscoe . |
| 3,124,371 | 3/1964 | Weir . |
| 3,832,837 | 9/1974 | Burkhart et al. ............... 56/218 |
| 3,990,718 | 11/1976 | Holland ......................... 280/408 |
| 4,081,946 | 4/1978 | Ehrhart .......................... 56/14.4 |
| 4,196,917 | 4/1980 | Oakes et al. .................. 280/463 |
| 4,478,032 | 10/1984 | Inskeep ........................... 56/377 |
| 4,577,881 | 3/1986 | Gerber ........................... 280/412 |
| 4,586,724 | 5/1986 | Sargent et al. ................ 280/412 |
| 4,662,161 | 5/1987 | Patterson ................... 56/15.4 X |
| 4,685,282 | 8/1987 | Allen .............................. 56/377 |
| 5,261,497 | 11/1993 | Snyder et al. ............. 280/412 X |

*Primary Examiner*—Terry Lee Melius
*Attorney, Agent, or Firm*—Henderson & Sturm

[57] ABSTRACT

The present invention teaches a novel steering apparatus which functions in conjunction with the tandem rake offset mechanism. The rear rake may be offset either left or right, thus permitting single or double windrowing, and also transmits steering commands to the rear rake unit such that it follows the tractor more precisely around the field and more effectively windrows the hay. A unique linkage assembly provides for both offset commands and steering commands to be passed to the rear rake unit.

7 Claims, 7 Drawing Sheets

STEERABLE TANDEM IMPLEMENT HITCH

TECHNICAL FIELD

The present invention relates to agricultural rakes, and more particularly to a dual, tandem rake apparatus with a rear rake which can be steered as well as offset from a towing vehicle.

BACKGROUND ART

Hay raking is accomplished after the hay has first been cut into swaths in order to turn the hay over and allow it to dry more thoroughly. With the introduction of more powerful tractors, it is now convenient to rake more than a single swath at a time, and this is accomplished using dual or tandem hay rakes. Depending upon the configuration of the rakes utilized, these tandem rakes may function to rake two swaths into separate windrows, or may rake two swaths into a single windrow. These windrows are then baled after the hay has had time to dry sufficiently. It is well known in the art to utilize mechanical or hydraulic means to offset the rearward hay rake from the forward rake in order to rake two separate swaths as the tractor passes down the swaths. However, the rearward rake has a tendency to cut inside the corner when the tractor makes a sharp turn and the rear rake then fails to properly rake its swath. This of course results in much more work for the farmer, or in lost product.

DISCLOSURE OF THE INVENTION

The present invention teaches a novel steering apparatus which functions in conjunction with the tandem rake offset mechanism. The rear rake may be offset either left or right, thus permitting single or double windrowing, and also transmits steering commands to the rear rake unit such that it follows the tractor more precisely around the field and more effectively windrows the hay. A unique linkage assembly provides for both offset commands and steering commands to be passed to the rear rake unit.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
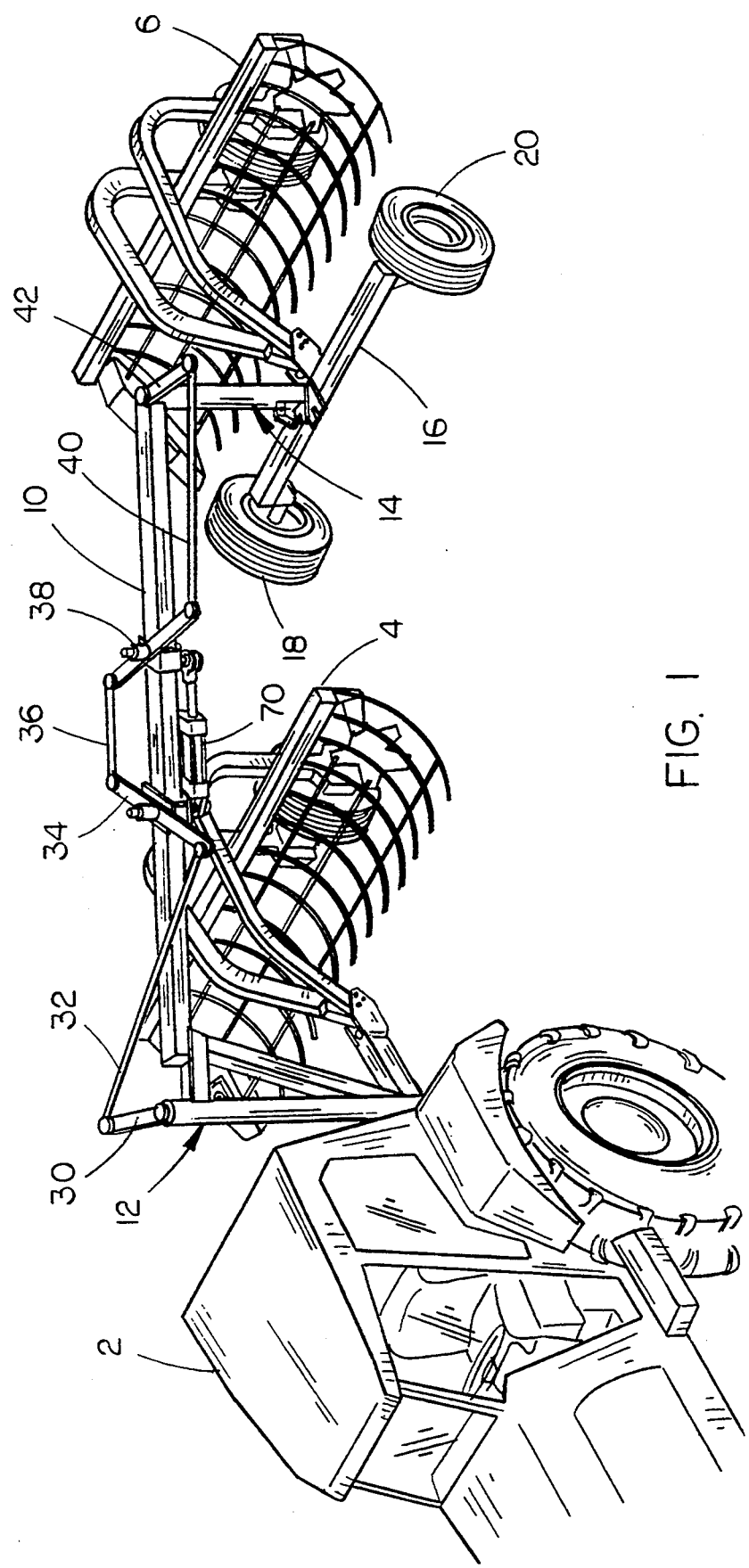
FIG. 1 is a perspective view of a tractor utilizing the invention to pull a pair of hay rakes, with the rear rake offset to the left.

A perspective view of the invention is shown in FIG. 1, in which a tractor 2 is pulling a forward rake 4 and a rear rake 6. In this Figure, the rear rake 6 is shown offset to the left of the forward rake 4, in which case two swaths of hay could be raked into a single windrow with rakes designed for left hand side delivery. The rear rake may also be offset to the right, in which case a pair of swaths can be raked into individual windrows.

The invention comprises a main longitudinal member 10, a forward support member 12, a rear support member 14, and a transverse frame member 16 which supports wheels assemblies 18, 20 at each end. It also includes an offset/steering linkage system which is comprised of a forward pivot arm 30, a forward link 32, a front crosslink 34 which is pivotally secured to the longitudinal member 10, an adjustable mid-link or turnbuckle 36, an aft crosslink 38 pivotally and slidably mounted on longitudinal member 10, rear link 40, and a rear pivot arm 42.

Figure 2:
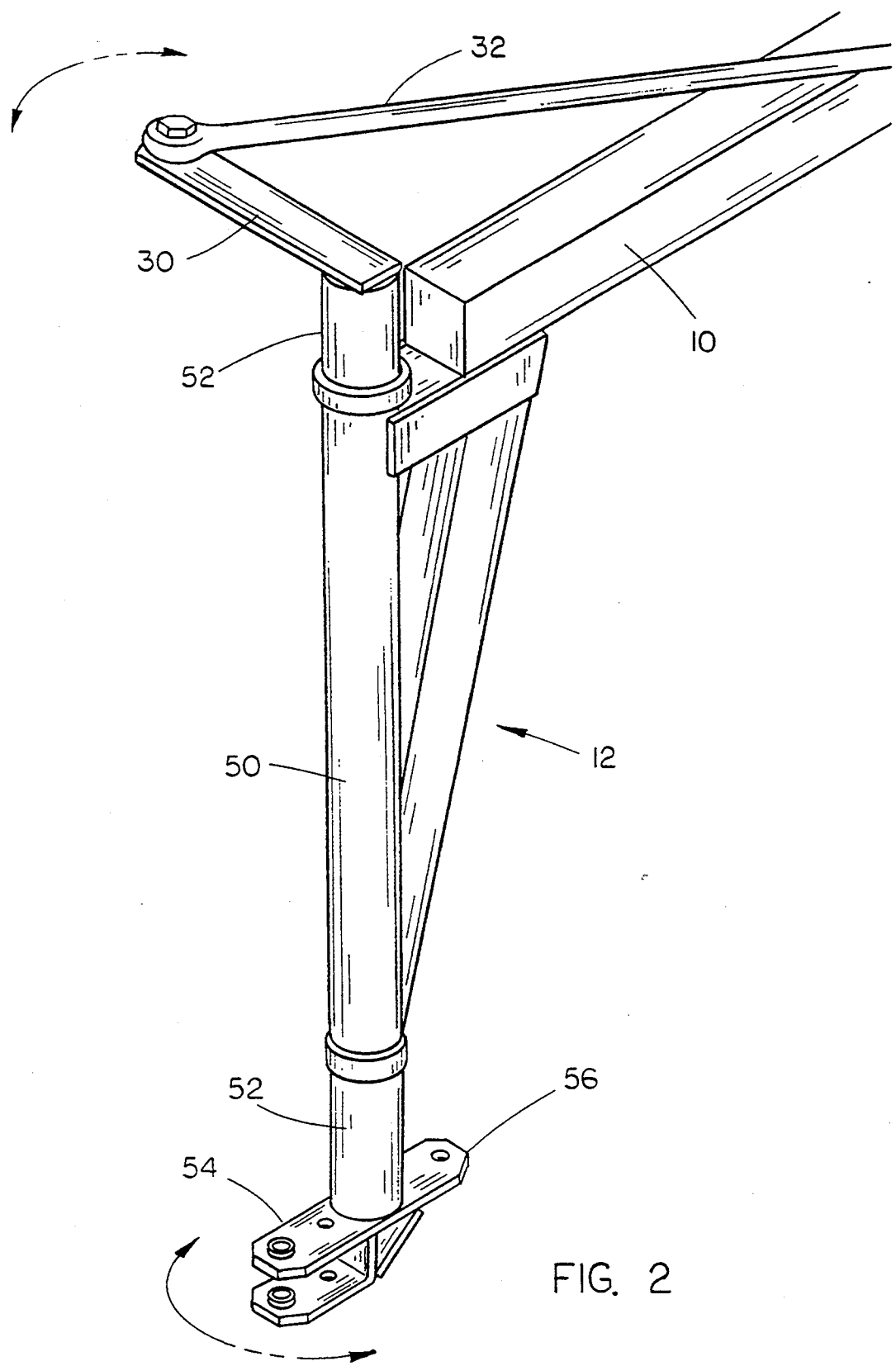
FIG. 2 is a perspective view of the forward support member, hitch means, and forward pivot arm.

Referring now to FIG. 2, the forward support member 12 is seen comprised of a sleeve 50 and shaft or tube 52 assembly with the shaft or tube 52 free to rotate within the sleeve 50, while remaining longitudinally fixed thereon. The invention is secured to the tractor drawbar by means of hitch means 54, it being noted that any turning of the tractor will impart rotation of shaft 52 within sleeve 50 which in turn will cause forward pivot arm 30 to swing forward or aft, which in turn causes forward link 32 to move forward or aft. Rearward of hitch means 54 is a drawbar 56 for attachment of the forward rake unit 4.

Figure 3:
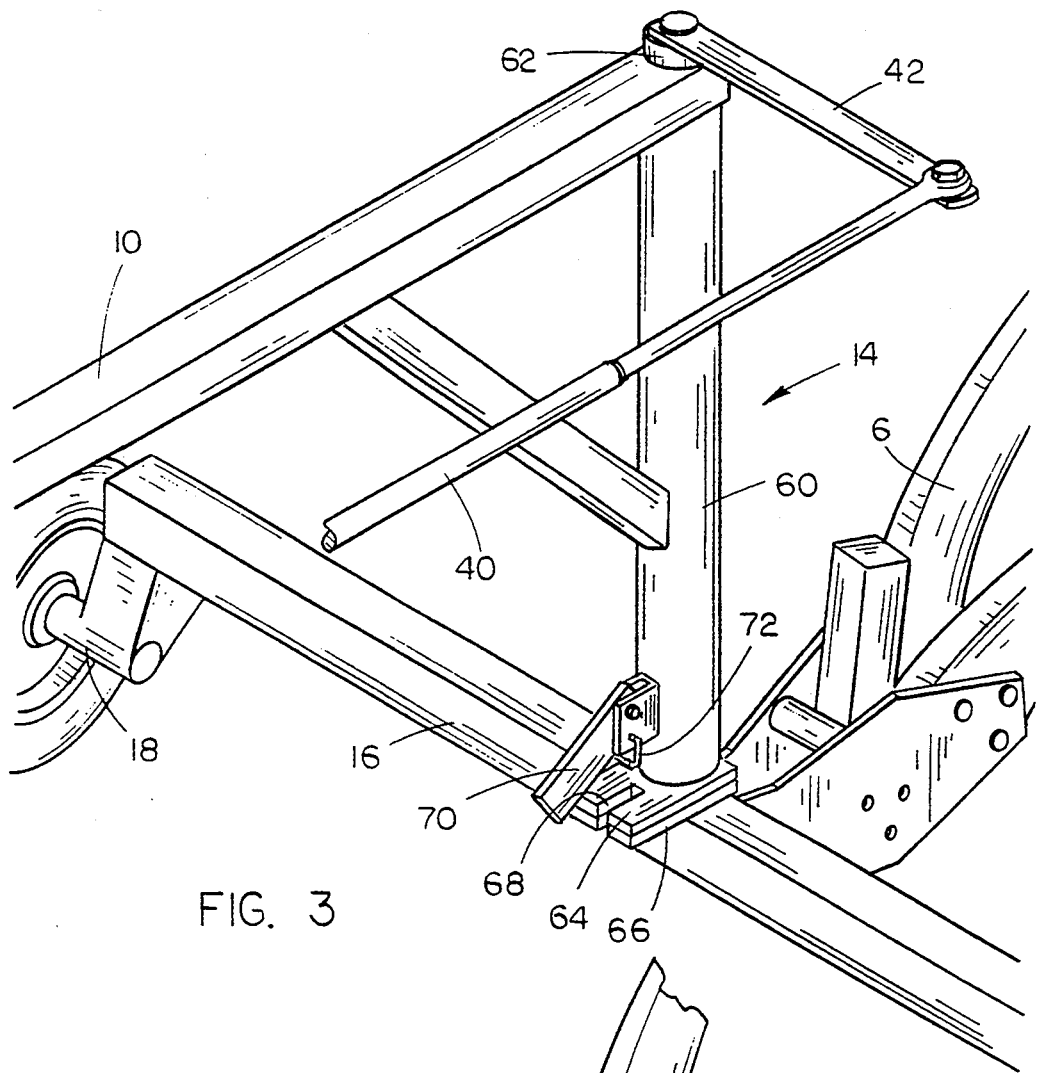
FIG. 3 is a perspective view of the rear support member and transverse frame member.
Figure 4:
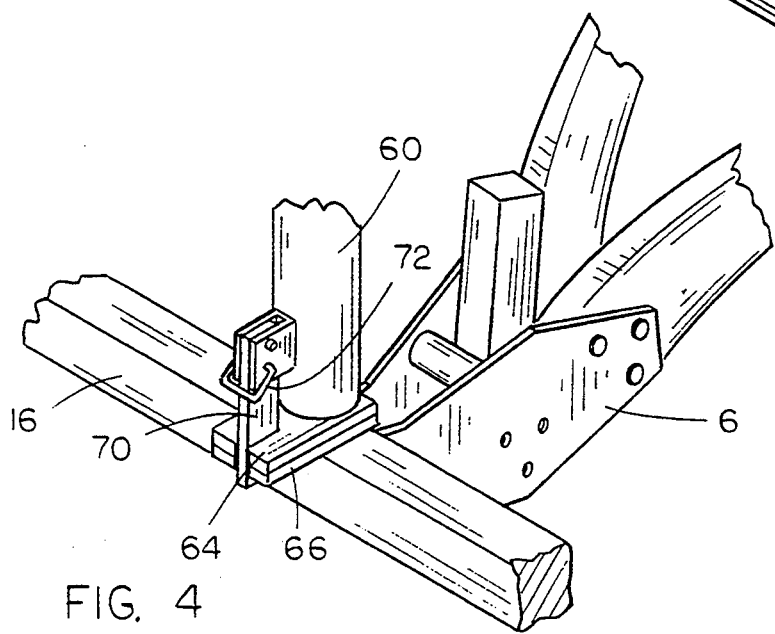
FIG. 4 is a close up view of the transverse frame member locked into the transport mode.

The rear support member 14 is depicted in FIG. 3 and functions in a manner similar to the forward support member 12. Vertical sleeve 60 houses therein a shaft or tube 62 which functions to transfer rotational forces from rear pivot arm 42 to transverse frame member 16 which is secured to the lower end of the rotatable shaft or tube 62. Pivoting of transverse frame member 16 is of course translated to the wheel assemblies 18, 20 and causes the rear of the unit to turn to the left or the right. If the pivot angle is held constant, the rear of the unit will remain displaced to one side or the other of the tractor. When the pivot angle is removed, the rear of the unit will return to the neutral, transport position as depicted in FIG. 3. The rear rake unit 6 is pivotally secured aft of the transverse frame member by means of a drawbar (not shown) similar to the forward drawbar 56. Attached to the lower end of sleeve 60 is a pivot plate 64 which rotates on top of a second pivot plate 66 which is secured to the upper surface of transverse frame member 16. Both of these pivot plates 64, 66 have a notch 68 cut through their forward ends into which may be rotated a lock bar 70. In the transport configuration of FIG. 4, the lock bar 70 is rotated into the notch 68 which thereby prevents rotation of the transverse frame member 16 relative to vertical sleeve 60. This configuration is convenient when moving the invention down a narrow lane or on the highway. When the invention is to be put to work, the lock bar 70 is rotated upward out of the notch 68 and held by means of pin 72.

Figure 5:
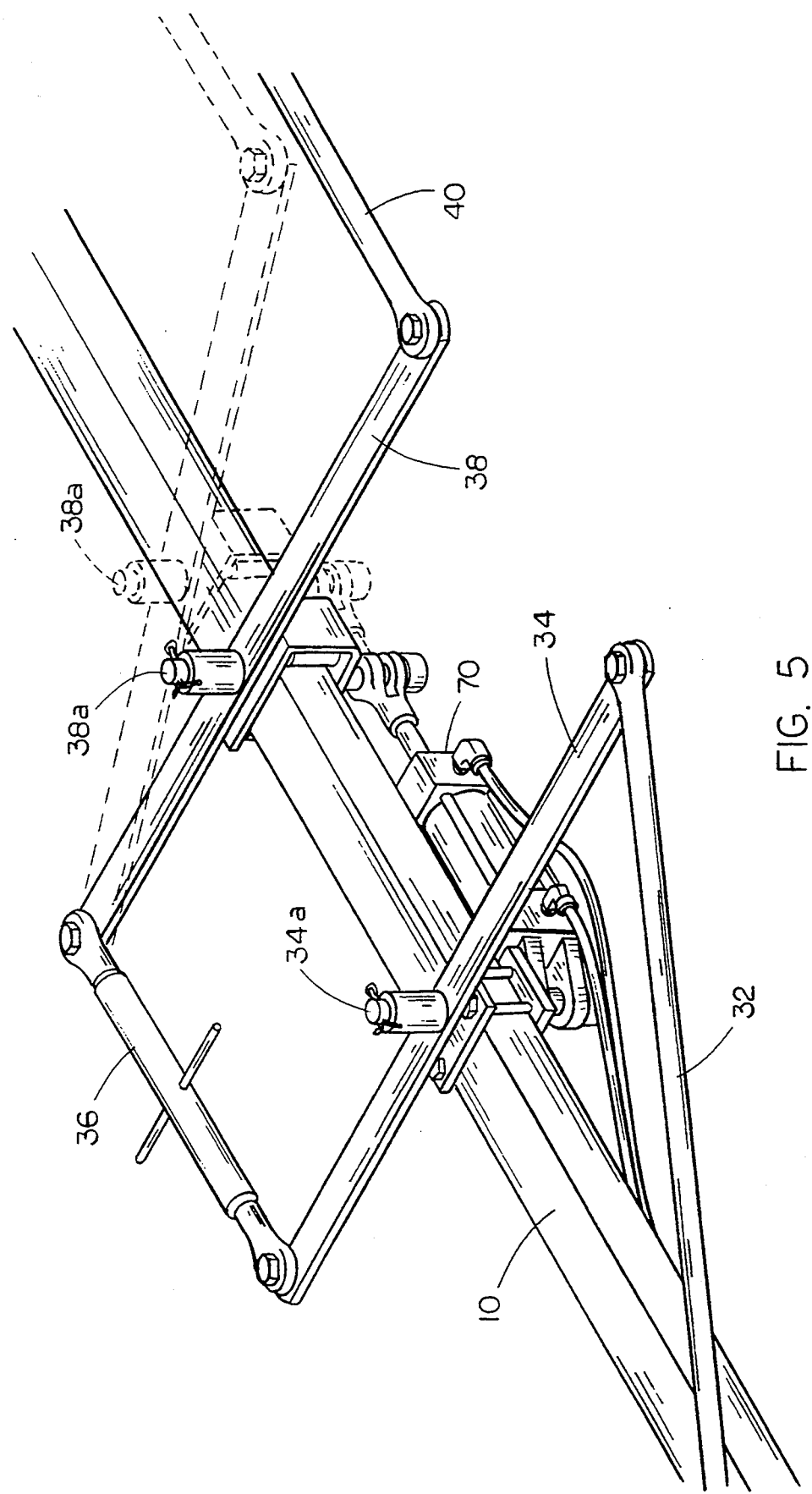
FIGS. 5 is a perspective view of the main linkage assembly.
Figure 6:
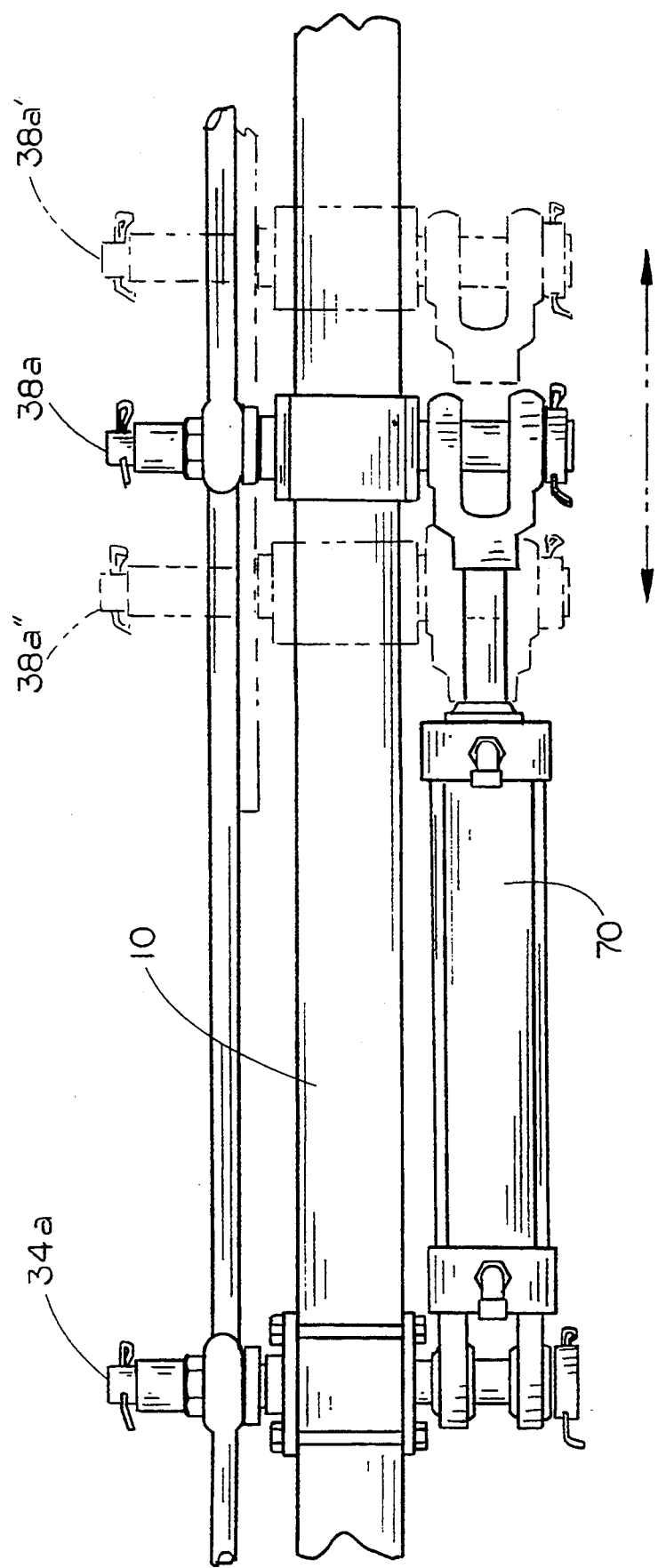
FIG. 6 is a side elevational view of the hydraulic cylinder in three states of extension.

The main offset/steering linkage assembly is depicted in FIG. 5. Pivot point 34a of front crosslink 34 is secured to longitudinal member 10 so as to prevent any longitudinal movement of front crosslink 34. However, pivot point 38a of rear crosslink 38 is free to move longitudinally along member 10 under the action of hydraulic cylinder 70 which is controlled from within the tractor. In the object line drawing, the hydraulic cylinder is in the neutral position and the invention would be in the transport position with the rear rake 6 directly behind the front rake 4. In the phantom line drawing of FIG. 5, the hydraulic piston has been extended, forcing pivot point 38a aft to point 38a'. This action displaces cross link 38 aft and also displaces rear link 40 aft. Referring to FIG. 3, it can be seen that the displacement of rear link 40 aft will cause pivot arm 42 to pivot, resulting in transverse frame member 16 pivoting to the left (counterclockwise). With the hydraulic cylinder 70 in this extended position, the rear of the invention will swing out to the left and remain offset left with respect to the tractor and forward rake. The reverse is of course true if the hydraulic piston is retracted. In that situation, pivot point 38a would be drawn forward to position 38a", resulting in pivot arm 42 pivoting clockwise and causing transverse member 16 to pivot to the right. With the hydraulic cylinder in this retracted position, the rear of the invention will swing out to the right and remain offset right with respect to the tractor and forward rake. FIG. 6 depicts the three positions of the hydraulic piston: retracted 38a", neutral 38a, and extended 38a'.

While it should be obvious to one skilled in the art that the hydraulic piston may be extended or retracted to any number of positions, and therefore the aft rake 6 may be offset different distances by selecting any of these positions, in a preferred embodiment the hydraulic piston will either be fully retracted, fully extended, or in a center position. This is acceptable since the hay swaths are ordinarily fixed distances apart. In order to adjust the offset distance of the rear rake, a turnbuckle 36 is used as seen in FIG. 5. When the hydraulic piston has been fully extended or fully retracted, this turnbuckle can be utilized to "fine-tune" the offset distance of the rear rake since extending or retracting the turnbuckle will produce slight pivoting action in transverse frame member 16 via linkage members 38, 40, and 42.

Figure 7:
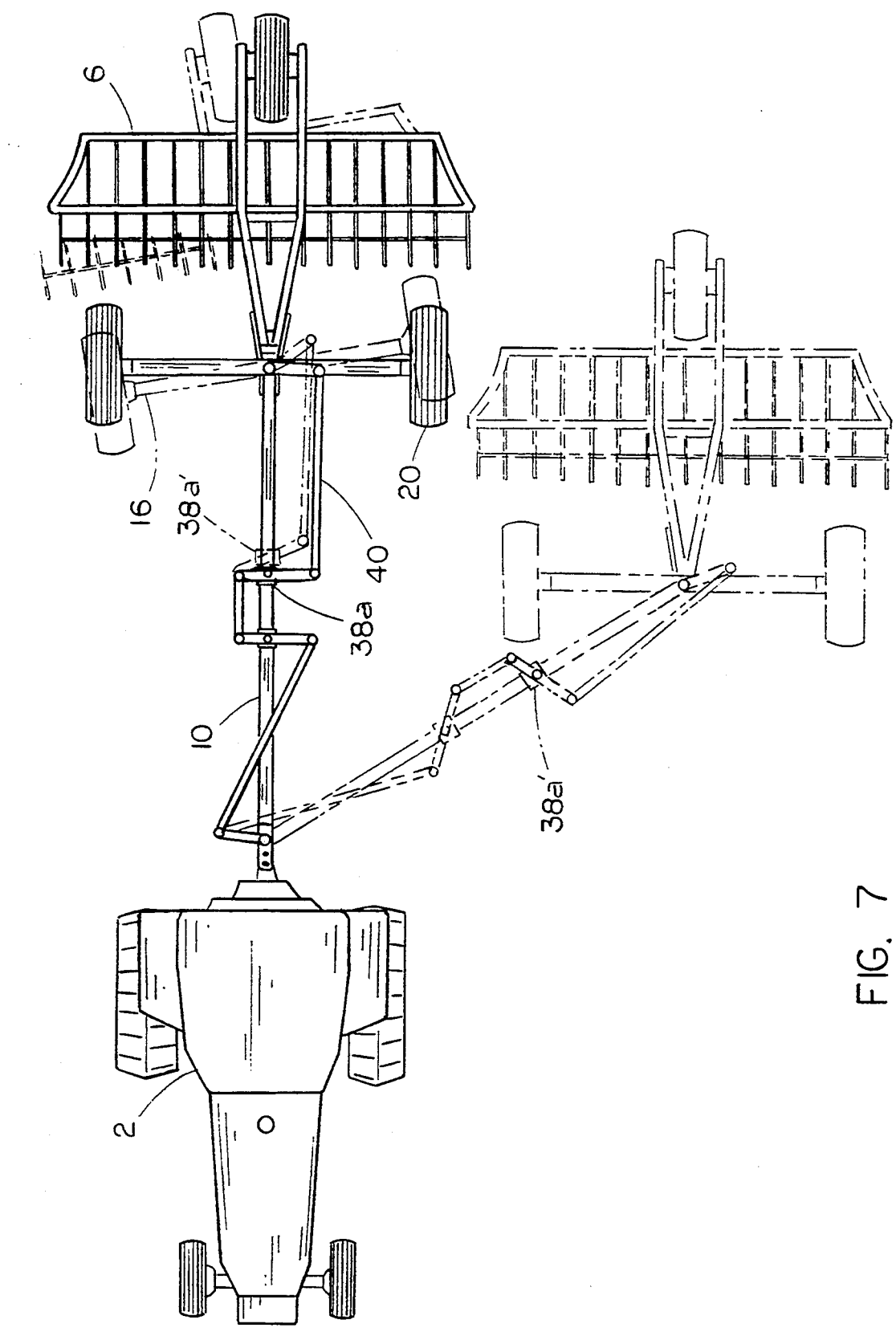
FIG. 7 is a top plan view showing, for simplicity, only the rear rake. The transport mode is shown in object lines, with the left offset position shown in phantom.

As seen in FIG. 7, in the object line the invention is in the transport configuration with the rear rake unit directly behind the tractor and forward rake unit (not shown for clarity). At this time, aft crosslink pivot point 38a is in the neutral position. When it is desired to offset the rear rake to the left, the hydraulic unit 70 is extended, forcing pivot point 38a to position 38a'. This action, as described above, causes transverse member 16 to pivot to the left, and the rear rake unit swings out and remains offset to the left. If the hydraulic unit is retracted, the rear rake unit will swing out and remain offset to the right.

Figure 8:
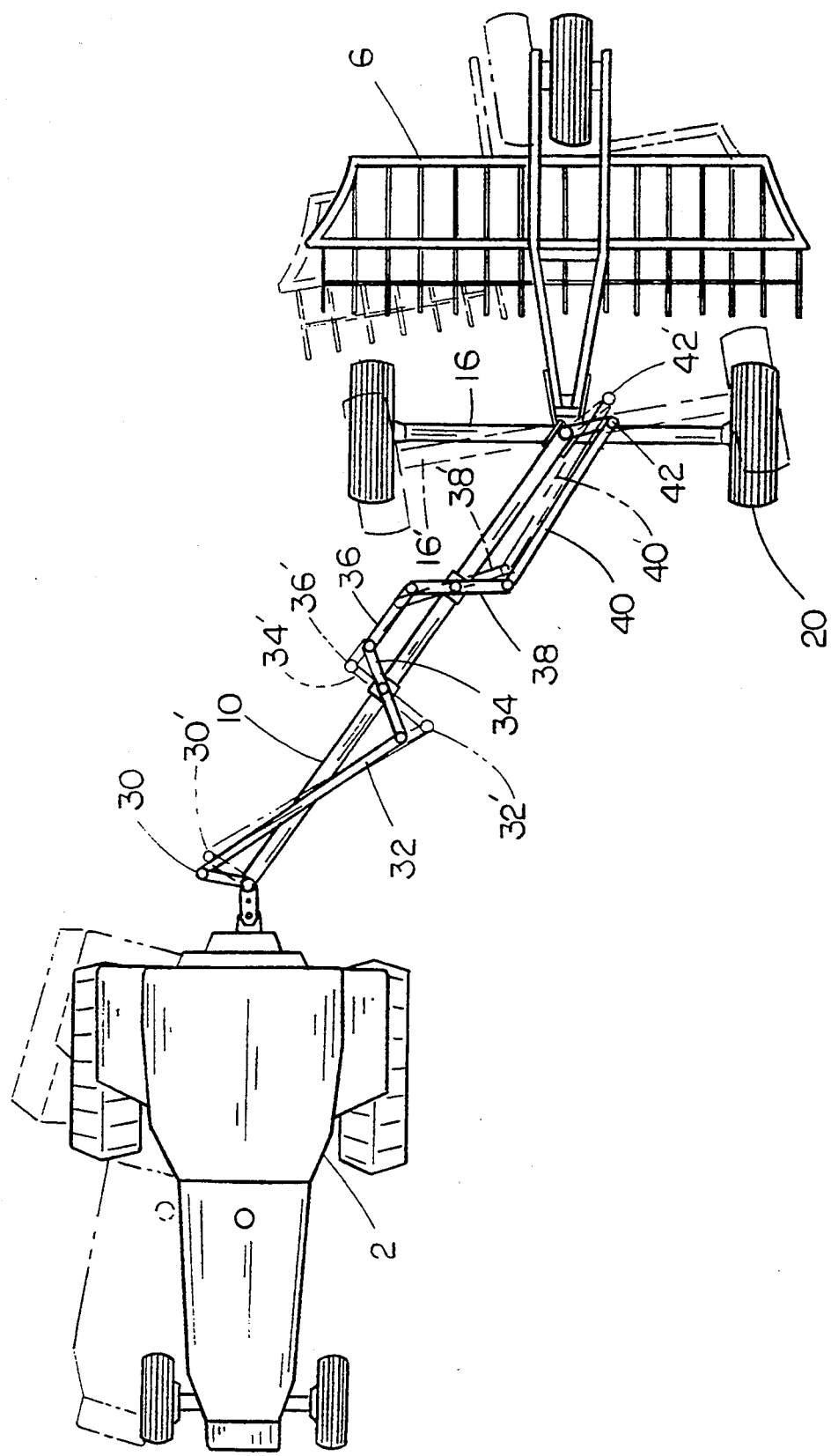
FIG. 8 is a top plan view of the invention, with the start of a right turn shown in phantom.

Steering of the invention is best seen in FIG. 8. In the object line drawing, the tractor and rake unit are traveling straight ahead, with the rear rake offset to the left. In prior art rakes, when the tractor turns to the right, the rear rake unit will tend to cut across the inside of the turn and thus fails to follow the hay swath. Shown in phantom in FIG. 8, as the tractor begins a right turn, the forward pivot arm rotates from 30 to 30'. This action causes forward link 32 to move to position 32', forward crosslink 34 to move to 34', midlink 36 to move to 36', aft crosslink 38 to move to 38', rear link 40 to move to position 40', rear pivot arm 42 to pivot to position 42', and finally transverse frame member 16 to pivot to 16'. The linkage thus causes the rear rake unit to follow the tractor around the turn and along the hay swath rather than cutting across the corner and missing the swath. As the tractor straightens out of the turn, the linkage likewise straightens out the rear transverse member such that it moves back to its original offset configuration. Of course, the steering linkage functions likewise during a left turn.

Obviously, many modifications and variations of the present invention are possible in light of the above teachings. For example, numerous other hitch means are available for attaching the invention to the tow vehicle. It is therefore to be understood that, within the scope of the appended claims, the invention may be practiced otherwise than as specifically described.

We claim:

1. A steerable tandem implement hitch for hay rakes and other agricultural equipment whereby two implements may be towed by a single vehicle and selectively positioned to track in tandem or offset to the left or right, comprising:

(a) a main longitudinal frame member having an elongate, substantially horizontal beam member, a forward support member depending from one end of said elongate beam member, and a rear support member depending from the other end of said elongate beam member;
   (b) said forward support member having a forward vertical shaft and sleeve assembly, hitch means for securing said forward vertical shaft to the towing vehicle, and a forward pivot arm affixed to the upper end of said forward vertical shaft;
   (c) said rear support member having a rear vertical shaft and sleeve assembly, a transverse frame member supporting a wheel assembly at each end thereof and affixed to the lower end of said rear vertical shaft, and a rear pivot arm affixed to the upper end of said rear vertical shaft;
   (d) means for pivoting said transverse frame member whereby said transverse frame member tracks offset and parallel with the towing vehicle; and
   (e) linkage means for transferring rotation of the forward vertical shaft through said forward pivot arm and said rear pivot arm to the rear vertical shaft whereby said transverse frame member pivots in response to turning of the towing vehicle.

2. The steerable tandem implement hitch as recited in claim 1 wherein said means for pivoting said transverse frame member comprises means for lengthening and shortening said linkage means.

3. The steerable tandem implement hitch as recited in claim 2 wherein said linkage means comprises a forward link connected to said forward pivot arm, a front crosslink pivotally mounted on said main longitudinal frame member and connected to said forward link, a mid-link connected to said front crosslink, an aft crosslink pivotally mounted on said main longitudinal frame member and connected to said mid-link, and a rear link connected to said aft crosslink and to said rear pivot arm.

4. The steerable tandem implement hitch as recited in claim 3 wherein said front crosslink is fixed on said main longitudinal frame and said aft crosslink can be shifted fore and aft on said main longitudinal frame.

5. The steerable tandem implement hitch as recited in claim 4 wherein said aft crosslink is shifted fore and aft on said main longitudinal frame by means of a hydraulic cylinder.

6. The steerable tandem implement hitch as recited in claim 5 wherein said midlink comprises a turnbuckle whereby the lateral positioning of the aft rake can be finely adjusted.

7. The steerable tandem implement hitch as recited in claim 6 wherein said rear support member and transverse frame member further comprises a pair of horizontal pivot plates having a tongue and groove assembly to lock the transverse frame member into a fixed, transport position.

* * * * *